United States Patent
Xiao

(10) Patent No.: US 11,902,706 B2
(45) Date of Patent: Feb. 13, 2024

(54) METHOD FOR TRANSMITTING HIGH BANDWIDTH CAMERA DATA THROUGH SERDES LINKS

(71) Applicant: SHENZHEN ANTU AUTONOMOUS DRIVING TECHNOLOGIES LTD., Shenzhen (CN)

(72) Inventor: Jianxiong Xiao, Shenzhen (CN)

(73) Assignee: SHENZHEN ANTU AUTONMOUS DRIVING TECHNOLOGIES LTD., Shenzhen (CN)

( * ) Notice: Subject to any disclaimer, the term of this patent is extended or adjusted under 35 U.S.C. 154(b) by 199 days.

(21) Appl. No.: 17/708,003

(22) Filed: Mar. 30, 2022

(65) Prior Publication Data

US 2022/0321840 A1    Oct. 6, 2022

(30) Foreign Application Priority Data

Mar. 30, 2021    (CN) .......................... 2021103436440

(51) Int. Cl.
*G06F 7/76*    (2006.01)
*H04N 7/04*    (2006.01)

(52) U.S. Cl.
CPC .................................... *H04N 7/04* (2013.01)

(58) Field of Classification Search
CPC .................................... G06F 7/76; H04N 7/04
See application file for complete search history.

(56) References Cited

U.S. PATENT DOCUMENTS 10,776,167 B2 * 9/2020 Nandan ..................... G06F 9/52
2022/0321840 A1 * 10/2022 Xiao ................. H04N 21/44016

FOREIGN PATENT DOCUMENTS

| CN | 102215173 B | * | 3/2014 | |
| CN | 104780333 A | * | 7/2015 | |
| CN | 105120211 B | * | 5/2019 | ......... H04N 21/4122 |
| CN | 113055675 A | * | 6/2021 | ........... H04N 19/156 |
| CN | 115767038 A | * | 3/2023 | |
| TW | 202328987 A | * | 7/2023 | ......... G02B 6/12002 |
| WO | WO-2016169133 A1 | * | 10/2016 | ............ H04J 3/0658 |
| WO | WO-2023044844 A1 | * | 3/2023 | |

* cited by examiner

*Primary Examiner* — Cheng Yuan Tseng

(57) ABSTRACT

A method for transmitting high bandwidth camera data through a SerDes links is provided. The method includes steps of: calculating transmission bandwidth required for transmitting image data, and the image data is obtained by a high bandwidth camera; determining a maximum bandwidth capacity of each SerDes link of a plurality of SerDes links; cutting the image data into a plurality of sub images according to the transmission bandwidth and the maximum bandwidth capacity of each SerDes link; assigning each sub image to a sub image transmission area in a corresponding SerDes link, and each SerDes link containing the sub image transmission area and the sub image reception area; acquiring a plurality of sub images transmitted in the plurality of the SerDes links from the corresponding sub image reception area; and splicing the plurality of sub images into the image data.

20 Claims, 4 Drawing Sheets

METHOD FOR TRANSMITTING HIGH BANDWIDTH CAMERA DATA THROUGH SERDES LINKS

This non-provisional patent application claims priority under 35 U.S.C. § 119 from Chinese Patent Application No. 202110343644.0 filed on Mar. 30, 2021, the entire content of which is incorporated herein by reference.

TECHNICAL FIELD

The disclosure relates to the field of autonomous driving technologies, in particular to a method for transmitting high bandwidth camera data through serializer/deserializer (SerDes) links, an intelligent control device and an autonomous vehicle.

BACKGROUND

For autonomous vehicles, larger and higher resolution camera sensors are needed to detect and identify vehicles with longer distance. In the autonomous driving systems, low latency is required to achieve faster system response. High resolution camera sensors cause the system to require additional bandwidth to transmit high frame rate image data. At present, the bandwidth required to transmit the image data of higher resolution camera sensors exceeds the bandwidth of the most advanced SerDes links used in autonomous vehicles. There has existed some methods for transmitting the image data of the high-resolution sensor on the link with limited bandwidth. For example, for the autonomous system with centralized processing unit, the following steps are required to obtain the image data from the higher-resolution sensor and then transmit the data: (1) Before sending the image data to the centralized processor, compressing the image data on the camera module side; (2) cutting out the region of interest of the image data to meet the bandwidth of the SerDes links; (3) reducing the frame rate of the camera sensor. None of the above methods can make full use of high-resolution camera sensors, because compression will lead to the loss of potentially important information, the use of a subset of the entire image data will lead to "waste" of pixels and information not seen by computing units, and the reduction of frame rate will lead to the increase of motion artifacts caused by delay and rolling shutter. Nowadays, all existing solutions for transmitting large camera sensor data need to reduce the sensor data so that the data is suitable for the SerDes links, but it results in information loss and/or increased delay and motion artifacts.

Therefore, there is a room for achieving high-speed transmission of high bandwidth camera image data.

SUMMARY

The disclosure provides a method for transmitting high bandwidth camera data through SerDes links an intelligent control device and an autonomous vehicle, which can realize fast and complete transmission of high bandwidth camera image data.

At a first aspect, a method for transmitting high bandwidth camera data through SerDes links is provided. The method for transmitting high bandwidth camera data through the SerDes links includes steps of calculating transmission bandwidth required for transmitting image data, and the image data is obtained by a high bandwidth camera; determining a maximum bandwidth capacity of each SerDes link of a plurality of SerDes links; cutting the image data into a plurality of sub images according to the transmission bandwidth and the maximum bandwidth capacity of each SerDes link; assigning each sub image to a sub image transmission area in a corresponding SerDes link, and each SerDes link containing the sub image transmission area and the sub image reception area; acquiring a plurality of sub images transmitted in the plurality of the SerDes links from the corresponding sub image reception area; and splicing the plurality of sub images into the image data.

At a second aspect, an intelligent control device is provided. The intelligent control device includes a memory for storing program instructions; and a processor for executing the program instruction to enable the intelligent control device to perform a method for transmitting high bandwidth camera data through the SerDes links. The method for transmitting high bandwidth camera data through the SerDes links includes steps of calculating transmission bandwidth required for transmitting image data, and the image data is obtained by a high bandwidth camera; determining a maximum bandwidth capacity of each SerDes link of a plurality of SerDes links; cutting the image data into a plurality of sub images according to the transmission bandwidth and the maximum bandwidth capacity of each SerDes link; assigning each sub image to a sub image transmission area in a corresponding SerDes link, and each SerDes link containing the sub image transmission area and the sub image reception area; acquiring a plurality of sub images transmitted in the plurality of SerDes links from the corresponding sub image reception area; and splicing the plurality of sub images into the image data.

At a third aspect, an autonomous vehicle is provided. The autonomous vehicle includes a main body and an intelligent control device positioned in the main body. The intelligent control device includes a memory for storing program instructions; and a processor for executing the program instruction to enable the intelligent control device to perform a method for transmitting high bandwidth camera data through SerDes links. The method for transmitting high bandwidth camera data through the SerDes links includes steps of calculating transmission bandwidth required for transmitting image data, and the image data is obtained by a high bandwidth camera; determining a maximum bandwidth capacity of each SerDes link of a plurality of SerDes links; cutting the image data into a plurality of sub images according to the transmission bandwidth and the maximum bandwidth capacity of each SerDes link; assigning each sub image to a sub image transmission area in a corresponding SerDes link, and each SerDes link containing the sub image transmission area and the sub image reception area; acquiring a plurality of sub images transmitted in the plurality of the SerDes links from the corresponding sub image reception area; and splicing the plurality of sub images into the image data.

The above method of transmitting high bandwidth camera data through the SerDes links determines the maximum bandwidth capacity of each SerDes link in the plurality of the SerDes links by calculating the transmission bandwidth required for transmitting image data, and cuts the image data into multiple sub images according to the transmission bandwidth and the maximum bandwidth capacity of each SerDes link. Each SerDes link in the plurality of the SerDes links is fully utilized, so as to improve the amount of data transmitted by the SerDes link and realize the rapid transmission of high bandwidth camera data. By assigning each sub image to the sub image transmission area in the corresponding SerDes link, each SerDes link includes a sub image transmission area and a sub image reception area, a plurality of sub images transmitted in the plurality of the SerDes links are obtained from the corresponding sub image reception area, and the plurality of sub images are spliced into image data. It makes full use of the bandwidth of each SerDes link, and then complete the image splicing according to the corresponding characteristics of the sub image transmission area and the sub image reception area, so as to maintain the integrity of the image and improve the utilization of the SerDes link, at the same time, the problem of information loss caused by transmitting various types of data through compressing and sharing the bus method in the prior art is avoided. and the SerDes link with limited bandwidth is capable of transmitting high broadband image data.

BRIEF DESCRIPTION OF THE DRAWINGS

In order to more clearly explain the embodiments of the invention or the technical solutions in the prior art, the following will briefly introduce the drawings that need to be used in the description of the embodiments or the prior art. Obviously, the drawings in the following description are only some embodiments of the invention. For those skilled in the art, other drawings can be obtained according to the structure shown in these drawings without paying creative labor.

The realization of the object, functional features and advantages of the invention will be further described with reference to the attached drawings in combination with the embodiment.

DETAILED DESCRIPTION OF THE EMBODIMENTS

In order to make the purpose, technical scheme and advantages of the invention more clear, the invention is further described in detail below in combination with the accompanying drawings and embodiments. It should be understood that the specific embodiments described herein are only used to explain the invention and are not used to limit the invention. Based on the embodiments of the invention, all other embodiments obtained by ordinary technicians in the art without making creative work belong to the protection scope of the invention.

The terms "first", "second", "third", "Fourth" and the like (if any) in the description and claims of the present application and the above drawings are used to distinguish similar objects, and need not be used to describe a specific order or order. It should be understood that the data so used can be interchanged where appropriate so that the embodiments described herein can be implemented in an order other than what is illustrated or described here. In addition, the terms "include" and "have" and any variations thereof are intended to cover non exclusive inclusion. For example, a process, method, system, product or equipment containing a series of steps or units need not be limited to those steps or units clearly listed, but may include those not clearly listed or for these processes, methods Other steps or units inherent in the product or equipment.

It should be noted that the description of "first", "second" and the like in the present invention is only for descriptive purposes and cannot be understood as indicating or implying its relative importance or implicitly indicating the number of indicated technical features. Thus, the features defining "first" and "second" may include at least one of the features explicitly or implicitly. In addition, the technical solutions between various embodiments can be combined with each other, but it must be based on the realization of ordinary technicians in the art. When the combination of technical solutions is contradictory or impossible, it should be considered that the combination of technical solutions does not exist and is not within the protection scope of the invention.

Figure 1:
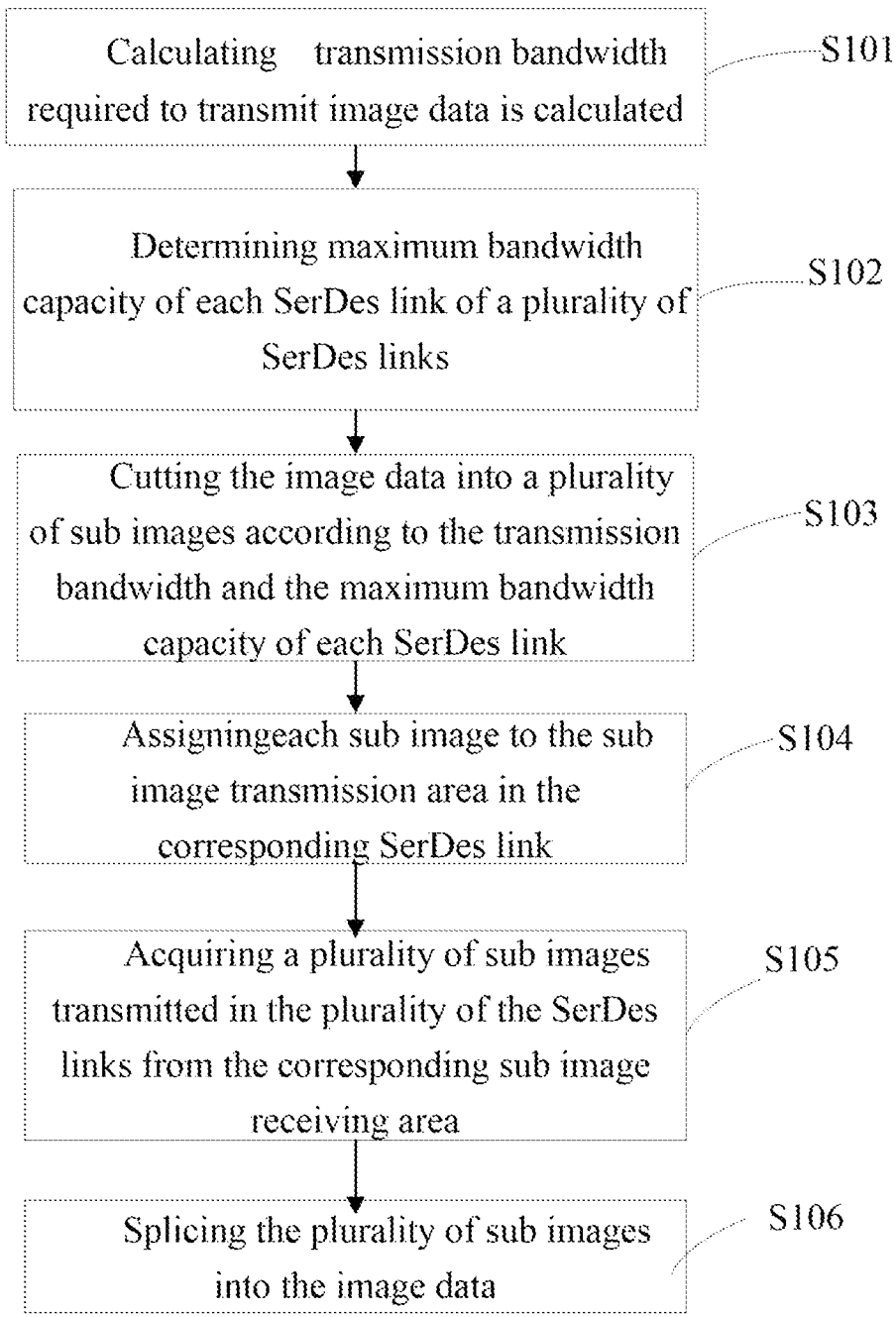
FIG. 1 illustrates a flowchart of a method for transmitting high bandwidth camera data through SerDes links in accordance with an embodiment.

Referring to FIG. 1, FIG. 1 illustrates a flow chart of a method for transmitting high bandwidth camera data through SerDes links in accordance with an first embodiment. The method for transmitting high bandwidth camera data through the SerDes links provided by the embodiment specifically includes the following steps.

In the step S101, transmission bandwidth required to transmit image data is calculated. The image data is obtained by a high bandwidth camera. The bandwidth of a digital camera is generally ranged from 30 frames/second-100 frames/second. Due to the characteristics of fast frame rate, short exposure time and high sensitivity, the high-speed camera can clearly capture an instantaneous change process that cannot be observed by human eyes or ordinary digital cameras, that is, the high-speed movement or change process of the measured object is transformed into image data with a time interval of milliseconds. In the field of autonomous driving, the image data are transmitted to the central processing unit through the transmission line, so that the autonomous vehicle can recognize the information contained in the image data and help the autonomous vehicle make a correct response.

The transmission bandwidth is amount of data that can pass through the link per unit time in digital equipment. Unit of the transmission bandwidth is generally expressed in bps (bit per second), that is, the number of bits that can be transmitted per second. Sometimes it is also expressed in Gbps, that is, gigabits. In this embodiment, The transmission bandwidth is the bandwidth required to transmit the image data obtained by the high bandwidth camera. In detail, taking the camera of 12.5 megapixel/megapixel (MP) and 30 frames per second (FPS) as an example, when the number of bytes required for each pixel is 24 bits, and the transmission speed of at least 9 gigabits (Gbps) is required. The calculation formula of transmission bandwidth is: pixels*bits of each pixel*frames per second=required transmission bandwidth per second. FPS refers to the number of frames transmitted per second of pictures. Generally, it refers to the number of pictures of animation or video. FPS is configured to measure the amount of information for saving and displaying dynamic video. The more frames per second, the smoother the motion displayed. Generally, the minimum to avoid non fluency is 30 FPS. Switching bandwidth (Gbps) is configured to measure total data exchange capacity of a switch. Ethernet is IEEE802 3 expansion of Ethernet standard, with transmission speed of 800 megabits per second (i.e. 1 Gbps). How to calculate transmission bandwidth required to transmit image data will described in following steps of S1011-S1013.

In the step S102, maximum bandwidth capacity of each SerDes link of a plurality of SerDes links is determined. The SerDes is an interface circuit in high-speed data communication, it is a common interface for the high-speed data communication. They not only play an important role in optical fiber data transmission, but also play an important role in short-distance chip interconnection, just as twisted pair (TP) for the network. The main structures of the SerDes includes an active synchronous interface structure, a pre-clock structure, a differential data packet transmission structure, etc. The serializer of the SerDes corresponds to the sub image transmission area, and the deserializer of the SerDes corresponds to the sub image reception area. It is a mainstream time division multiplexing (TDM) and peer-to-peer (P2P) serial communication technology. That is, at the transmitter end, the multi-channel low-speed parallel signal is converted into a high-speed serial signal, which passes through the transmission medium (optical cable or copper wire), and finally at the receiver end, the high-speed serial signal is converted into a low-speed parallel signal. This point-to-point serial communication technology makes full use of the channel capacity of the transmission media, reduces the number of required transmission channels and device pins, improves the signal transmission speed, and greatly reduces the communication cost. In detail, determining maximum bandwidth capacity of each SerDes link of the plurality of the SerDes links is to determine how many Gbps the high transmission rate of each of the multiple SerDes links is. For example, the high transmission rate of each SerDes link is 6 Gbps.

In some embodiments, the SerDes link can also be radio frequency identification SerDes (RF-SerDes).

In the step S103, the image data is cut into a plurality of sub images according to the transmission bandwidth and the maximum bandwidth capacity of each SerDes link. In this embodiment, the image data can be cut by vertical cutting, or the image data can be cut according to pixels. In practical application, the data image is cut according to the actual needs. If there is no complex image information in the image data, the image can be cut according to direct vertical cutting. If there is complex image in the image data, such as tree shape, the image can be cut according to the information contained in the pixel to ensure that the information contained in the image data will not be lost. Specifically, when the data to be transmitted by the high bandwidth camera is 9 Gbps, it can be directly cut into sub images of 4.5 Gbps. 4.5 Gbps is less than 6 Gbps, which can ensure the complete and rapid transmission of image data.

Figure 3:
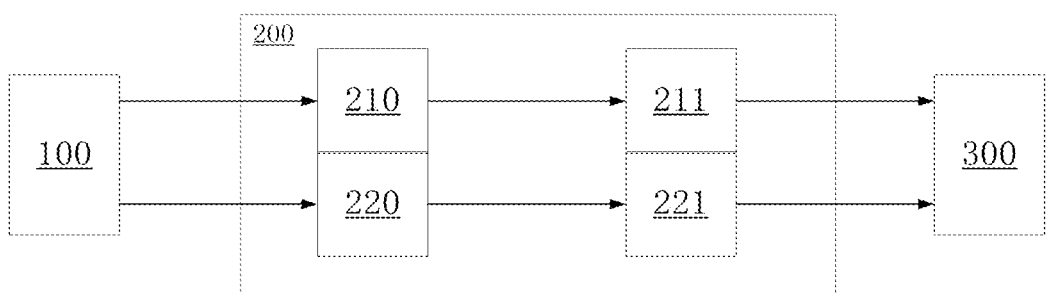
FIG. 3 illustrates a schematic diagram of the SerDes link in accordance with an embodiment.

In the step S104, each sub image is assigned to the sub image transmission area in the corresponding SerDes link. Each SerDes link includes a sub image transmission area and a sub image reception area. As shown in FIG. 3, an image acquisition and segmentation unit 100 inputs two sub images into the SerDes link 200, and obtains image data through the image receiving and splicing unit 300. Each SerDes link includes a sub image transmission area and a sub image reception area. For example, the first SerDes link (not shown) includes a sub image transmission area 210 and a sub image reception area 211. The second SerDes link (not shown) includes a sub image transmission area 220 and a sub image reception area 221. The sub image transmission areas and the sub image reception are correspond one-to-one. The sub image transmission area is managed by the serializer, and the sub image reception area is managed by the deserializer.

In the step S105, a plurality of sub images transmitted in the plurality of the SerDes links are acquired from the corresponding sub image reception area.

In the step S106, the plurality of sub images are spliced into image data.

In the above embodiment, by determining the maximum bandwidth capacity of each SerDes link in the plurality of SerDes links, and cutting the image data into a plurality of sub images according to the transmission bandwidth and the maximum bandwidth capacity of each SerDes link, each SerDes link in the plurality of the SerDes links can be fully utilized, so as to improve the amount of data transmitted by the SerDes link and realize the fast transmission of high bandwidth camera data. By assigning each sub image to the sub image transmission area in the corresponding SerDes link, each SerDes link includes a sub image transmission area and a sub image reception area, a plurality of sub images transmitted in the plurality of the SerDes links are obtained from the corresponding sub image reception area, and a plurality of sub images are spliced into image data. Make full use of the bandwidth of each SerDes link, and then complete the image splicing according to the corresponding characteristics of the sub image transmission area and the sub image reception area, so as to maintain the integrity of the image and improve the utilization of the SerDes link. At the same time, the problem of information loss caused by image data transmission caused by the method for compressing and sharing the bus to transmit various types of data in the prior art is avoided. The SerDes link with limited bandwidth is used to transmit high broadband image data.

Figure 2:
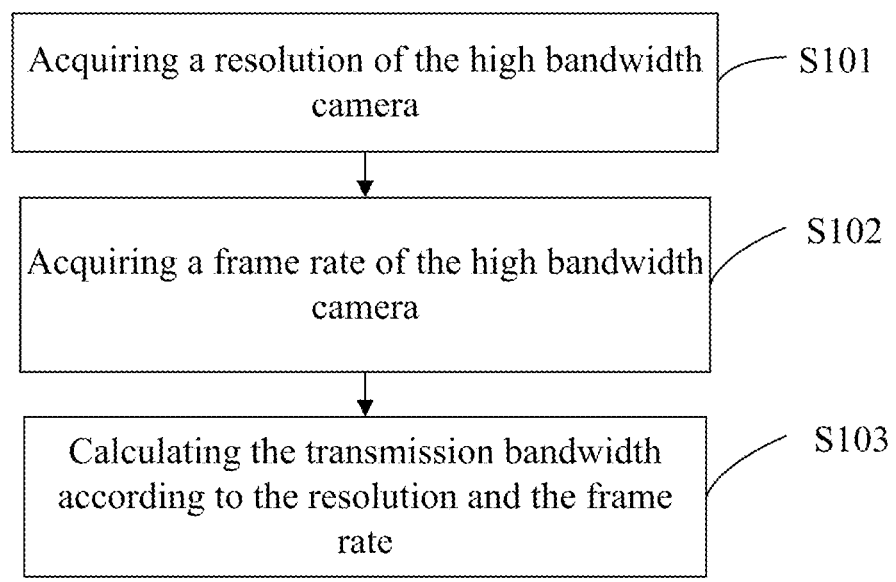
FIG. 2 illustrates a sub flowchart of a method for transmitting high bandwidth camera data through SerDes links in accordance with an embodiment.

Referring to FIG. 2, FIG. 2 illustrates the sub-step flowchart of step S101 in an embodiment. The step S101 of calculating the transmission bandwidth required to transmit image data including following steps of S1011-S1013.

In the step S1011, a resolution of the high bandwidth camera is acquired. In this embodiment, the resolution of the adopted high-speed camera is 12.5 mp.

In the step S1012, a frame rate of the high bandwidth camera is acquired. In this embodiment, the frame rate of the adopted high-speed camera is 30 fps.

In the step S1013, a transmission bandwidth is calculated according to the resolution and the frame rate. The calculation formula of transmission bandwidth is: pixels*bits of each pixel*frames per second=required transmission bandwidth per second. In this embodiment, the number of bytes required for each pixel is 24 bits. In detail, 12.5 mp*30 fps*24 bit=9 Gbps. The transmission speed of at least 9 gigabits (Gbps) is required. That is, the transmission bandwidth is 9 Gbps.

In some embodiments, the image data obtained by the high bandwidth camera is extracted by a image signal processor (ISP), and a plurality of sub images are spliced into image data by a field programmable gate array (FPGA). The ISP is configured to process the output signal of the front-end image sensor to match the image sensors of different manufacturers. In other embodiments, the camera uses ISP and pipelined dedicated engine to process image signals at high speed, which will describe bellow.

Figure 4:
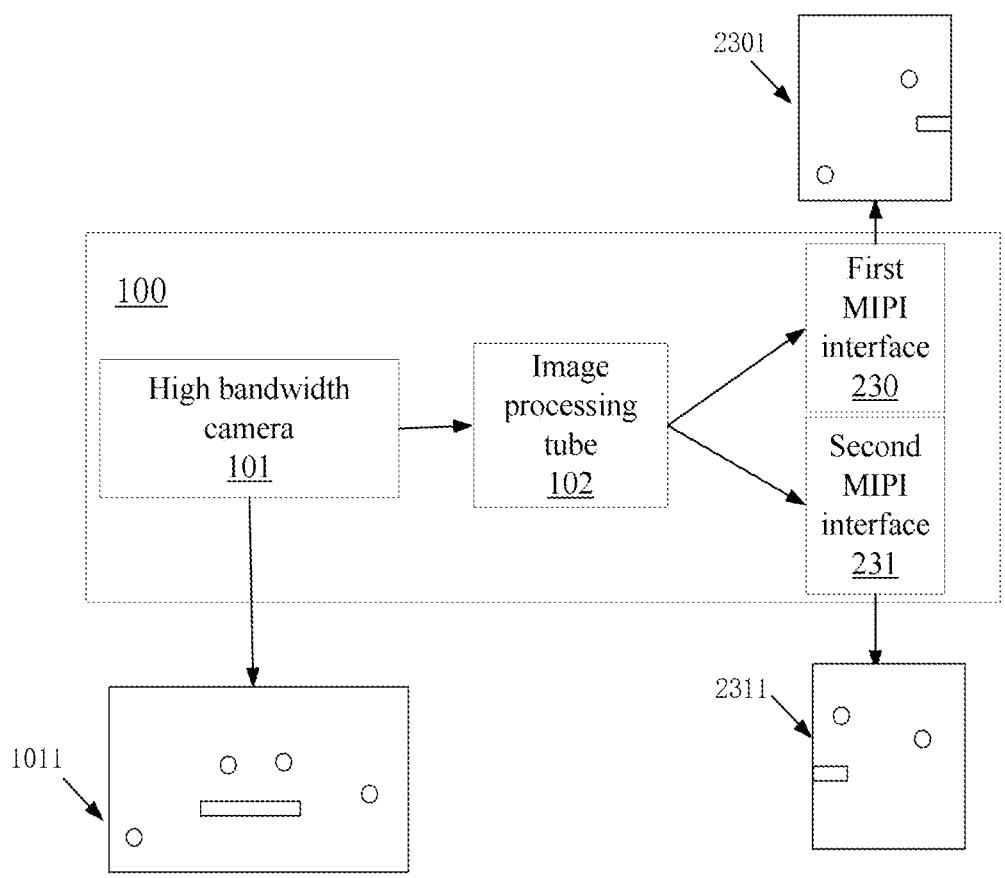
FIG. 4 illustrates a schematic diagram of an image acquisition and segmentation unit in accordance with an embodiment.

Referring to FIG. 4, the high bandwidth camera 101 is electrically connected with an image processing tube 102, and the image processing tube 102 is electrically connected with different mobile industry processor interfaces (MIPI interfaces). The MIPI interfaces corresponds to the sub image transmission area one by one, and the MIPI interfaces corresponds to the serializer one by one. For example, the high bandwidth camera 101 acquires the image data 1011 and cuts the image data through the ISP stored in the image processing tube 102 that the first sub image 2301 and the second sub image 2311 are obtained. The first sub image 2301 and the second sub image 2311 are transmitted to the first image reception area 210 and the second sub image reception area 220 in the SerDes link through the first MIPI interface 230 and the second MIPI interface 231.

The belongs to a semi custom circuit in ASIC. The FPGA is the product of further development on the basis of programmable devices such as a personal application Integration (PAI) and a generic array logic (GAL). It appears as a semi custom circuit in the field of application specific integrated circuits (ASIC). It not only solves the shortcomings of custom circuits, but also overcomes the shortcomings of the limited number of programmable gate circuits. The FPGA can effectively solve a problem of less number of original device gates. In this embodiment, the image data obtained by the high bandwidth camera is extracted by the ISP, a plurality of sub images are spliced into image data by FPGA, and the image data is transmitted to a system on chip (SOC). The SOC is an integrated circuit with special objectives, which contains a complete system and all the contents of embedded software.

In some preferred embodiments, the image data is cut into a plurality of sub images by linear cutting according to the transmission bandwidth and the maximum bandwidth capacity of each SerDes link.

Furthermore, each sub image can be independently transmitted in the SerDes link through MIPI interface. The MIPI interface is an open standard and specification for mobile application processor initiated by MIPI alliance. MIPI interface is any interface that conforms to the specifications formulated by MIPI alliance. Specifically, each sub image can independently enter the SerDes link at the interface conforming to MIPI specification, and transmit the high bandwidth camera to the chip through the SerDes link. The chip has an image processing function.

In some preferred embodiments, the image data is cut into a plurality of sub images according to the transmission bandwidth and the maximum bandwidth capacity of each SerDes link. The sub image can be a regular rectangle or other irregular graphics. Further, each sub image can be independently transmitted in the SerDes link through MIPI interface. Furthermore, each sub image is stored in a single line buffer and/or a first input first output (FIFO) memory. The single line buffer is a buffer for intelligent one-way transmission of data, that is, data transmitted from the high broadband camera end to the chip end by one-way. The FIFO memory is a memory with a FIFO chip.

In the above embodiment, the FIFO chip has the advantages of large capacity, small volume and low price. As a new type of large-scale integrated circuit, FIFO chi has been more and more widely used in high-speed data acquisition, high-speed data processing, high-speed data transmission and multi machine processing systems because of its flexibility, convenience and efficiency. The receiving efficiency of image data is improved.

Figure 5:
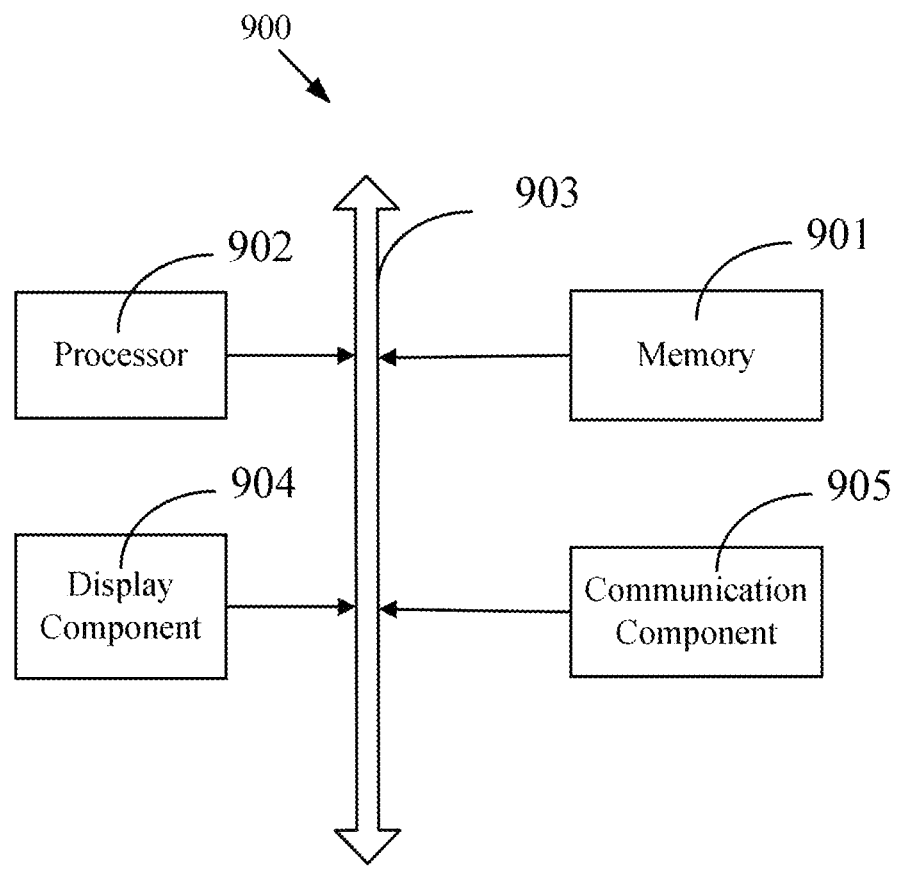
FIG. 5 illustrates a schematic diagram of the internal structure of the intelligent control device in accordance with an embodiment.

As illustrated in FIG. 5, the disclosure also provides an intelligent control device 900, the intelligent control device 900 comprises at least a memory 901 and a processor 902. The memory 901 is configured to store program instructions of the method for transmitting high bandwidth camera data through the SerDes links. The processor 902 is used to execute program instructions to enable the intelligent control device to perform the method of transmitting high bandwidth camera data through the SerDes links.

The memory 901 includes at least one type of readable storage medium, which includes flash memory, hard disk, multimedia card, card memory (E. G., SD or DX memory, etc.), magnetic memory, magnetic disk, optical disc, etc. In some embodiments, the memory 901 may be an internal storage unit of the intelligent control device 900, such as a hard disk of the intelligent control device 900. In other embodiments, the memory 901 may also be an external storage device of the intelligent control device 900, such as a plug-in hard disk equipped on the intelligent control device 900, a smart media card (SMC), a secure digital card (SD), a flash card, etc. Further, the memory 901 may also include both an internal storage unit of the intelligent control device 900 and an external storage device. The memory 901 can be used not only to store the application software and various data installed in the intelligent control device 900, such as the program instruction of the method for transmitting high bandwidth camera data through the SerDes links, but also to temporarily store the data that has been output or will be output, such as the data generated by the execution of the method for transmitting high bandwidth camera data through the SerDes links.

In some embodiments, the processor 902 may be a central processing unit (CPU), controller, microcontroller, microprocessor or other data processing chip for running program instructions or processing data stored in the memory 901. Specifically, the processor 902 executes the program instruction of the method for transmitting high bandwidth camera data through the SerDes links to control the intelligent control device 900 to realize the method for transmitting high bandwidth camera data through the SerDes links.

Furthermore, the intelligent control device 900 may also include a bus 903, which may be a peripheral component interconnect (PCI) or an extended industry standard architecture (EISA). The bus can be cut into address bus, data bus, control bus and so on. For ease of representation, only one thick line is used in FIG. 5, but it does not mean that there is only one bus or one type of bus.

Further, the intelligent control device 900 may also include a display component 904. The display component 904 may be an LED (light emitting diode) display, a liquid crystal display, a touch liquid crystal display, an OLED (organic light emitting diode) touch device, etc. The display component 904 may also be appropriately referred to as a display device or a display unit for displaying information processed in the intelligent control device 900 and a user interface for displaying visualization.

Further, the intelligent control device 900 may also include a communication component 905, which may optionally include wired communication components and/or wireless communication components (such as Wi-Fi communication components, Bluetooth communication components, etc.), which are usually used to establish a communication connection between the intelligent control device 900 and other intelligent control devices.

FIG. 5 shows only the intelligent control device 900 with components 901-905 and program instructions for realizing the method for transmitting high bandwidth camera data through the SerDes links. It can be understood by those skilled in the art that the structure shown in FIG. 5 does not constitute a limitation on the intelligent control device 900, and may include fewer or more components than shown in the figure, or combine some components, Or different component arrangements. Since the intelligent control device 900 adopts all the technical solutions of all the above embodiments, it has at least all the beneficial effects brought by the technical solutions of the above embodiments, which will not be repeated here.

In the above embodiments, it can be realized in whole or in part by software, hardware, firmware or any combination thereof. When implemented in software, it can be implemented in whole or in part in the form of computer program products.

Those skilled in the art can clearly understand that for the convenience and simplicity of description, the specific working process of the above described system, device and unit can refer to the corresponding process in the above method embodiment, which will not be repeated here.

In above embodiments, it should be understood that the disclosed systems, devices and methods can be realized in other ways. For example, the embodiment of the method for transmitting high bandwidth camera data through the SerDes links described above is only schematic. For example, the division of the unit is only a logical function division, and there can be another division mode in actual implementation. For example, multiple units or components can be combined or integrated into another system, or some features can be ignored, Or not. On the other hand, the mutual coupling or direct coupling or communication connection shown or discussed can be indirect coupling or communication connection through some interfaces, devices or units, and can be electrical, mechanical or other forms.

The unit described as a separate component can be or may not be physically separated, and the component displayed as a unit can be or may not be a physical unit, that is, it can be located in one place or distributed to multiple network units. Some or all of the units can be selected according to the actual needs to achieve the purpose of the embodiment.

In addition, each functional unit in each embodiment of the application can be integrated into one processing unit, each unit can exist separately, or two or more units can be integrated into one unit. The above integrated units can be realized in the form of hardware or software functional units.

Figure 6:
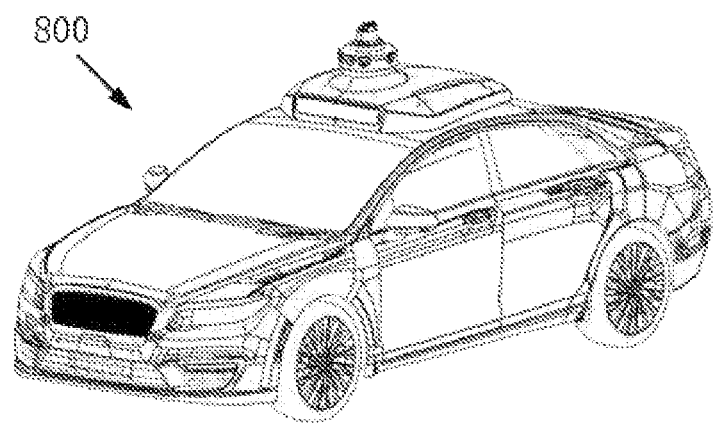
FIG. 6 illustrates a schematic diagram of an autonomous vehicle in accordance with an embodiment.

The disclosure also provides an autonomous vehicle 100, which can realize the above SerDes links to transmit high bandwidth camera data. As illustrated in FIG. 6, the autonomous vehicle 800 includes an intelligent control device 900, a high bandwidth camera (not shown) and a SerDes (not shown). The detail of each elements such as the intelligent control device 900, a high bandwidth camera and a SerDes can be referred to the description above correspondingly. Since the autonomous vehicle 800 contain the intelligent control device 900, it also can solve problem shown as above.

Obviously, those skilled in the art can make various changes and modifications to the invention without departing from the spirit and scope of the invention. Thus, if these modifications and variants of the invention fall within the scope of the claims of the invention and its equivalent technology, the invention is also intended to include these modifications and variants.

The above list is only the preferred embodiments of the invention, and of course, it cannot limit the scope of the invention. Therefore, the equivalent changes made according to the claims of the invention still belong to the scope of the invention.

The invention claimed is:

1. A method for transmitting high bandwidth camera data through SerDes links, comprising:
   calculating transmission bandwidth required for transmitting image data, and the image data is obtained by a high bandwidth camera;
   determining a maximum bandwidth capacity of each SerDes link of a plurality of SerDes links;
   cutting the image data into a plurality of sub images according to the transmission bandwidth and the maximum bandwidth capacity of each SerDes link;
   assigning each sub image to a sub image transmission area in a corresponding SerDes link, and each SerDes link containing the sub image transmission area and the sub image reception area;
   acquiring a plurality of sub images transmitted in the plurality of the SerDes links from the corresponding sub image reception area; and
   splicing the plurality of sub images into the image data.

2. The method for transmitting high bandwidth camera data through the SerDes links according to claim 1, wherein calculating transmission bandwidth required for transmitting image data comprises:
   acquiring a resolution of the high bandwidth camera;
   acquiring a frame rate of the high bandwidth camera;
   and calculating the transmission bandwidth according to the resolution and the frame rate.

3. The method for transmitting high bandwidth camera data through SerDes links according to claim 1, wherein the image data obtained by the high bandwidth camera is extracted by ISP, and the plurality of sub images are spliced into the image data by FPGA.

4. The method for transmitting high bandwidth camera data through the SerDes links according to claim 1, wherein the image data is cut into a plurality of sub images by linear cutting according to the transmission bandwidth and the maximum bandwidth capacity of each SerDes link.

5. The method for transmitting high bandwidth camera data through the SerDes links according to claim 4, wherein each sub image is capable of being independently transmitting in the SerDes link through a MIPI interface.

6. The method for transmitting high bandwidth camera data through the SerDes links according to claim 1, wherein the image data is cut into a plurality of sub images according to the transmission bandwidth and the maximum bandwidth capacity of each SerDes link.

7. The method for transmitting high bandwidth camera data through the SerDes links according to claim 6, wherein each sub image can be independently transmitted in the SerDes link through a MIPI interface.

8. The method for transmitting high bandwidth camera data through the SerDes links according to claim 7, wherein each sub image not transmitted is stored in a single line buffer and/or a FIFO memory.

9. An intelligent control device, comprises:
   a memory for storing program instructions; and
   a processor for executing the program instruction to enable the intelligent control device to perform a method for transmitting high bandwidth camera data through SerDes links, the method for transmitting high bandwidth camera data through the SerDes links comprising:
   calculating transmission bandwidth required for transmitting image data, and the image data is obtained by a high bandwidth camera;
   determining a maximum bandwidth capacity of each SerDes link of a plurality of SerDes links;
   cutting the image data into a plurality of sub images according to the transmission bandwidth and the maximum bandwidth capacity of each SerDes link;

assigning each sub image to a sub image transmission area in a corresponding SerDes link, and each SerDes link containing the sub image transmission area and the sub image reception area;

acquiring a plurality of sub images transmitted in the plurality of the SerDes links from the corresponding sub image reception area; and splicing the plurality of sub images into the image data.

10. The intelligent control device according to claim 9, wherein calculating transmission bandwidth required for transmitting image data comprises:

acquiring a resolution of the high bandwidth camera;

acquiring a frame rate of the high bandwidth camera;

and calculating the transmission bandwidth according to the resolution and the frame rate.

11. The intelligent control device according to claim 9, wherein the image data obtained by the high bandwidth camera is extracted by an ISP, and the plurality of sub images are spliced into the image data by a FPGA.

12. The intelligent control device according to claim 9, wherein the image data is cut into a plurality of sub images by linear cutting according to the transmission bandwidth and the maximum bandwidth capacity of each SerDes link.

13. The intelligent control device according to claim 12, wherein each sub image is capable of being independently transmitted in the SerDes link through MIPI interface.

14. The intelligent control device according to claim 9, wherein the image data is cut into a plurality of sub images according to the transmission bandwidth and the maximum bandwidth capacity of each SerDes link.

15. The intelligent control device according to claim 14, wherein each sub image can be independently transmitted in the SerDes link through a MIPI interface.

16. The intelligent control device according to claim 15, wherein each sub image not transmitted is stored in a single line buffer and/or FIFO memory.

17. An autonomous vehicle, comprising:

a main body, and an intelligent control device positioned in the main body, and the intelligent control device comprising:

a memory for storing program instructions; and a processor for executing the program instruction to enable the intelligent control device to perform a method for transmitting high bandwidth camera data through SerDes links, the method for transmitting high bandwidth camera data through the SerDes links comprising:

calculating transmission bandwidth required for transmitting image data, and the image data is obtained by a high bandwidth camera;

determining a maximum bandwidth capacity of each SerDes link of a plurality of the SerDes links;

cutting the image data into a plurality of sub images according to the transmission bandwidth and the maximum bandwidth capacity of each SerDes link;

assigning each sub image to a sub image transmission area in a corresponding SerDes link, and each SerDes link containing the sub image transmission area and the sub image reception area;

acquiring a plurality of sub images transmitted in the plurality of the SerDes links from the corresponding sub image reception area; and splicing the plurality of sub images into the image data.

18. The autonomous vehicle according to claim 17, wherein calculating transmission bandwidth required for transmitting image data comprises:

acquiring a resolution of the high bandwidth camera;

acquiring a frame rate of the high bandwidth camera;

and calculating the transmission bandwidth according to the resolution and the frame rate.

19. The autonomous vehicle according to claim 17, wherein the image data obtained by the high bandwidth camera is extracted by an ISP, and the plurality of sub images are spliced into the image data by a FPGA.

20. The autonomous vehicle according to claim 17, wherein the image data is cut into a plurality of sub images by linear cutting according to the transmission bandwidth and the maximum bandwidth capacity of each SerDes link.

* * * * *